United States Patent [19]

Arrandale et al.

[11] 3,889,030

[45] June 10, 1975

[54] METHOD OF COATING GLASS ARTICLE AND IMPROVED COATED GLASSWARE PRODUCT

[75] Inventors: Roy S. Arrandale, Elmira; Wayne A. Walding, Horseheads; Barney R. Daugherty, Elmira, all of N.Y.

[73] Assignee: Dart Industries Inc., Los Angeles, Calif.

[22] Filed: Aug. 22, 1972

[21] Appl. No.: 282,824

[52] U.S. Cl. ............... 428/215; 117/72; 117/94; 117/124 E; 427/314; 427/379; 428/442; 428/516; 215/DIG. 6
[51] Int. Cl. .................... C03c 17/32; B32b 17/10
[58] Field of Search .......... 117/72, 94, 124 E, 47 H; 215/1 C, DIG. 6

[56] References Cited
UNITED STATES PATENTS

| | | | |
|---|---|---|---|
| 2,965,596 | 12/1960 | Sharf | 117/124 E X |
| 3,211,808 | 10/1965 | Young et al | 117/124 E X |
| 3,376,155 | 4/1968 | O'Donnell | 117/72 |
| 3,415,673 | 12/1968 | Clock | 117/72 |
| 3,418,153 | 12/1968 | Levene | 117/72 |
| 3,420,693 | 1/1969 | Scholes et al. | 117/72 |
| 3,661,628 | 5/1972 | Marsden | 117/72 X |

*Primary Examiner*—Ralph Husack
*Attorney, Agent, or Firm*—Kenneth J. Hovet; Leigh B. Taylor; Paul R. Wylie

[57] ABSTRACT

Articles of glass are coated by applying a first undercoating of an ethylenically unsaturated carboxylic acid which is preferably a polyacrylic acid followed by a coating of a homopolymer of a polyolefin preferably polyethylene. The resulting product has improved durability and resistance to shattering.

11 Claims, No Drawings

METHOD OF COATING GLASS ARTICLE AND IMPROVED COATED GLASSWARE PRODUCT

This invention generally relates to coated glass articles. More specifically it relates to coated glassware of the type adapted to contain carbonated beverages. The glassware produced according to the invention has improved durability and resistance to shattering.

BACKGROUND OF THE INVENTION

Conventional glass bottles, and particularly those that are used to package pressurized liquids such as carbonated beverages and the like, are susceptible if improperly impacted with sharp objects of sending glass fragments flying, sometimes with considerable force. While for the most part conventional glass containers are safe, nevertheless an improvement in the margin of safety is desirable.

Glass containers in the past have been provided with coatings for protection against scratches and to enhance safety. One class of such coatings are generally known as lubricity coatings such as, for example, the coating disclosed in U.S. Pat. No. 3,420,693. In that type of coating, relatively thin layers of protective material are applied to the surface of the glass mainly to protect it during manufacture, inspection, shipping, and filling by providing a surface lubricity to enable the bottles when they come in contact to easily slip by one another without abrasion with concomitant introduction of surface flaws and reduced bottle strength.

Relatively thicker coatings than the lubricity coatings have also been applied to glass bottles used as aerosol containers. With respect to glass aerosol containers, a relatively heavy coating is required to protect against flying of glass fragments due to the high propellant pressure present in the aerosol bottle.

Several attempts have been made to apply coatings to glass containers utilizing thermoplastic resinous polymers such as polyolefins. It has been found that in order for these polymers to adhere to the glass they generally must be provided as a copolymer with functional groups added by copolymerizing with acetic comonomers. A copolymer of this type is disclosed in U.S. Pat. No. 3,415,673. Although it would be preferable to coat glass containers with straight homopolymers of polyolefin and particularly a homopolymer of polyethylene, it has not heretofore been considered feasible to apply such homopolymers to glass bottles due to lack of adhesion. On the other hand, the copolymers which have heretofore been used have not been entirely satisfactory because they will not withstand caustic washing or conditions of high humidity which are required for the handling of beverage bottles.

BRIEF SUMMARY OF THE INVENTION

There is provided according to this invention a method of coating a glass article wherein a first undercoating is applied to the article with such undercoating comprising a polymer of an ethylenically unsaturated carboxylic acid. A second coating is then applied with such second coating consisting essentially of a homopolymer of a thermoplastic resin. The second coating is then cured upon the bottle.

There is also provided according to this invention an improved coated glassware article having improved durability and resistance to shattering which includes a glass container, a first undercoating comprising a polymer of an ethylenically unsaturated carboxylic acid and a second coating consisting essentially of a homopolymer of a thermoplastic resin.

In the process according to the invention a conventional glass article, preferably a glass container suitable for packaging beverages or the like is coated with a first undercoating and a second overcoating of a thermoplastic resin. The bottle can either be a bare bottle of virgin glass or it can have a lubricity coating of tin oxide or titanium trioxide directly adhered to the surface of the glassware at the time the virgin glass article is formed.

To the glass article is applied a first undercoating comprising a polymer of an ethylenically unsaturated carboxylic acid. This undercoating is preferably applied in spray form of an emulsion or solution of such carboxylic acid and in a preferred form of the invention the undercoating is applied as an aqueous solution of a polyacrylic acid. The coating is applied so that a so-called "monomolecular" thickness is present on the bottle and in any event the coating is applied to a thickness of less than about 0.001 inch.

In a preferred form of the invention the glass article is brought to a heated condition before applying the first undercoating and in the case of glassware this temperature will be within the range of about 150° to about 250°F.

Following the application of the first undercoating the second coating which consists essentially of a homopolymer of a thermoplastic resin can be applied. In a preferred form of the invention it is desirable to heat the undercoated glassware to a temperature in the range of about 350° to about 450°F before applying the second coating. The second coating can be applied by several suitable methods including:

a. spraying the thermoplastic material as a powder by an electrostatic spraying method on to the hot external surface of the undercoated glassware article;

b. dipping the undercoated glassware in a hot condition in a fluidized bed of the thermoplastic material in powder form or c. dipping the undercoated glassware while it is hot into a molten bath of the thermoplastic material or alternatively into a solution or a dispersion of such material.

Following the second coating step according to the invention, the homopolymer thermoplastic resin can be cured on the bottle.

The first undercoating of an ethylenically unsaturated carboxylic acid is preferably a polyacrylic acid material. In the preferred form of the invention the polyacrylic acid is applied as an aqueous solution containing from about 0.5 to about 25 percent by weight polyacrylic acid. In a more preferred form, the polyacrylic acid is present from about 1 to about 3 percent. It is preferred to use a polyacrylic acid having a molecular weight between about 150,000 to about 300,000.

The second coating which will consist essentially of a homopolymer of a thermoplastic resin is preferably a polyolefin of which polyethylene has been found to be highly satisfactory in the preferred form of the invention. It has been found that by varying the melt index of the polyethylene that either a pebbled nodular finish or a smooth finish can be obtained. For obtaining a smooth surface, a melt index in the range of about 20 to about 30 has been found satisfactory. Pebbled surfaces can be obtained with melt indexes in the range of about 5 to about 10. In any event, the melt index of the polyethylene material is preferred to be in the range of about 5 to about 100.

The coated glassware article according to the invention will preferably have a first undercoating of a polymer of ethylenically unsaturated carboxylic acid of a thickness less than about 0.001 inch and a second coating of a homopolymer of a polyolefin in the range of about 0.004 to about 0.035 inch thick.

SPECIFIC EXAMPLE

A 28 oz. capacity glass bottle containing approximately 17 oz. of glass was coated by applying a 5% aqueous solution of "Acrysol A5" polyacrylic acid which had approximately 1.25 percent acrylic acid content by spraying the solution on the bottle which was heated to approximately 200°F. The bottle was then heated to approximately 400°F and dipped into a fluidized bed of a powdered homoplymer of ethylene. The coated bottle was then cured. Coated bottles prepared according to this method were then tested and compared with coated bottles having copolymer coatings. It was found that the bottles prepared according to this method out performed the bottles having a copolymer coating when subjected to drop tests.

Reasonable variation and modification are possible within the foregoing disclosure and within the invention.

What is now claimed is:

1. The method of coating a glass article comprising
   a. applying a first coating to said article, said first coating consisting essentially of a polymer of an ethylenically unsaturated carboxylic acid;
   b. applying a second coating consisting essentially of a homopolymer of an olefin resin said second coating being relatively thicker than said first coating; and
   c. curing said second coating.

2. The method according to claim 1 wherein the temperature of said glass article is brought to a heated condition before the application of said first and second coatings.

3. The method according to claim 2 wherein said glass article is heated to a temperature within the range of about 150 to about 250°F before the application of said first coat and again heated to a temperature in the range of about 350° to about 450°F before the application of said second coating.

4. The method according to claim 1 wherein said polymer of an ethylenically unsaturated carboxylic acid is polyacrylic acid.

5. The method according to claim 4 wherein said polyacrylic acid is in the form of an aqueous solution and said polyolefin as a homopolymer of ethylene.

6. The method according to claim 5 wherein said aqueous solution contains between about 0.5 to about 25 percent by weight polyacrylic acid and said homopolymer of ethylene has a melt index of between about 5 to about 100.

7. The method according to claim 1 wherein said glass article is an uncoated virgin glass bottle.

8. Coated glassware article having improved durability and resistance to shattering comprising
   a. a glass container
   b. a first coating consisting essentially of a polymer of an ethylenically unsaturated carboxylic acid; and
   c. a second coating consisting essentially of a homopolymer of an olefin said second coating being relatively thicker than said first coating.

9. Coated glassware according to claim 8 wherein said polymer of ethylenically unsaturated carboxylic acid is polyacrylic acid.

10. Coated glassware according to claim 9 wherein said olefin is ethylene.

11. Coated glassware according to claim 10 wherein said first coating of a polymer of ethylenically unsaturated carboxylic acid is less than about 0.001 inch thick and said second coating of a homopolymer of an olefin is about 0.004 to about 0.035 inch thick.

* * * * *